United States Patent
Ahn et al.

(10) Patent No.: US 11,573,644 B2
(45) Date of Patent: Feb. 7, 2023

(54) APPARATUS AND METHOD FOR RECOGNIZING GESTURE

(71) Applicant: HYUNDAI MOBIS Co., Ltd., Seoul (KR)

(72) Inventors: Sung Joon Ahn, Seoul (KR); Seung Hwan Lee, Hwaseong-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 17/236,378

(22) Filed: Apr. 21, 2021

(65) Prior Publication Data
US 2021/0325972 A1    Oct. 21, 2021

(30) Foreign Application Priority Data

| Apr. 21, 2020 | (KR) | 10-2020-0048346 |
| Apr. 21, 2020 | (KR) | 10-2020-0048347 |
| Apr. 21, 2020 | (KR) | 10-2020-0048348 |
| Apr. 23, 2020 | (KR) | 10-2020-0049629 |

(51) Int. Cl.

| G06F 3/01 | (2006.01) |
| G06K 7/10 | (2006.01) |
| G06V 40/20 | (2022.01) |
| G06V 40/10 | (2022.01) |
| G06V 40/16 | (2022.01) |

(52) U.S. Cl.
CPC ............ *G06F 3/017* (2013.01); *G06F 3/013* (2013.01); *G06F 3/014* (2013.01); *G06K 7/10306* (2013.01); *G06V 40/107* (2022.01); *G06V 40/174* (2022.01); *G06V 40/28* (2022.01)

(58) Field of Classification Search
CPC .......... G06F 3/017; G06F 3/013; G06F 3/014; G06K 7/10306; G06K 19/07762; G06V 40/107; G06V 40/174; G06V 40/28
See application file for complete search history.

(56) References Cited

U.S. PATENT DOCUMENTS

| 10,890,981 | B2* | 1/2021 | Chen | B60K 35/00 |
| 2015/0031348 | A1* | 1/2015 | Lee | G06F 3/0482 455/418 |
| 2016/0170493 | A1* | 6/2016 | Park | G06F 3/017 345/156 |
| 2016/0368382 | A1* | 12/2016 | Schlittenbauer | B60K 37/06 |
| 2017/0147074 | A1* | 5/2017 | Buttolo | B60N 2/02 |
| 2018/0107278 | A1* | 4/2018 | Goel | G06F 3/014 |
| 2018/0292901 | A1* | 10/2018 | Priyantha | G06F 1/163 |
| 2018/0314416 | A1* | 11/2018 | Powderly | G06F 3/041 |
| 2019/0302895 | A1* | 10/2019 | Jiang | G06F 3/038 |

* cited by examiner

*Primary Examiner* — Jennifer N Welch
*Assistant Examiner* — Amy P Hoang
(74) *Attorney, Agent, or Firm* — NSIP Law

(57) ABSTRACT

Provided are a gesture recognition apparatus and method. The gesture recognition apparatus includes a first communication circuit configured to communicate with a wearable device worn on a first body part of a user, a memory in which a gesture recognition program is stored, and a processor configured to execute the gesture recognition program, wherein the processor receives motion information from the wearable device through the first communication circuit, checks a position of the wearable device, determines whether a gesture is to be recognized according to the position of the wearable device on the basis of the motion information, and executes a function corresponding to the gesture.

13 Claims, 22 Drawing Sheets

APPARATUS AND METHOD FOR RECOGNIZING GESTURE

CROSS-REFERENCE TO RELATED APPLICATION

This application claims priority to and the benefit of Korean Patent Application No. 10-2020-0048346, filed on Apr. 21, 2020, Korean Patent Application No. 10-2020-0049629, filed on Apr. 23, 2020, Korean Patent Application No. 10-2020-0048347, filed on Apr. 21, 2020, and Korean Patent Application No. 10-2020-0048348, filed on Apr. 21, 2020, the disclosures of which are incorporated herein by reference in their entirety.

BACKGROUND

1. Field of the Invention

The present invention relates to an apparatus and method for recognizing a gesture.

2. Discussion of Related Art

According to the related art, techniques in which a user's gesture is recognized and a function corresponding to the gesture is executed are being developed.

A vehicle system according to the related art photographs an occupant using an in-vehicle camera and recognizes a gesture on the basis of a captured image.

However, there is a problem in that the conventional vehicle system may recognize a gesture only in a narrow region within a viewing angle range of a camera, and that, when the quality of an image is lowered due to external illumination (e.g., low or high illumination), the reliability of the gesture recognition is degraded.

SUMMARY OF THE INVENTION

The present invention is directed to providing an apparatus and method for recognizing a gesture in which a problem of a gesture recognition apparatus according to the related art not sufficiently reflecting the characteristics of a vehicle system is solved and user convenience for gesture operations is improved.

According to an aspect of the present invention, there is provided a gesture recognition apparatus including a first communication circuit configured to communicate with a wearable device worn on a first body part of a user, a memory in which a gesture recognition program is stored, and a processor configured to execute the gesture recognition program, wherein the processor receives motion information from the wearable device through the first communication circuit, checks a position of the wearable device, determines whether gesture recognition based on the motion information is performed according to the position of the wearable device, and executes a function corresponding to a gesture.

When the wearable device is located in a preset region, the processor may not perform the gesture recognition based on the motion information.

The preset region may include at least one designated region of a steering wheel, a gear rod, and an armrest.

When the wearable device approaches the preset region, the processor may determine whether the first body part grips a designated part in the preset region on the basis of the motion information and may not perform the gesture recognition based on the motion information.

When the wearable device is located in the preset region, the processor may charge a battery of the wearable device through the power transmission circuit.

The processor may obtain biometric information of the user from the wearable device, identify an emotional state of the user on the basis of the biometric information, and execute the function corresponding to the recognized gesture differently according to the emotional state.

The processor may track a gaze of the user on the basis of an image captured by a camera, determine a target device to be controlled located in a direction of the gaze of the user, and allow the target device to be controlled to execute the function corresponding to the recognized gesture.

The processor may check the position of the wearable device using an ultra-wideband (UWB) communication method through the first communication circuit.

The processor may receive information related to a touch of the first body part on the wearable device from the wearable device and execute the function corresponding to the recognized gesture differently according to whether the first body part is touched by the wearable device.

According to another aspect of the present invention, there is provided a gesture recognition method including an operation (a) of receiving motion information from a wearable device, an operation (b) of checking a position of the wearable device, an operation (c) of determining whether gesture recognition based on the motion information is performed according to the position of the wearable device, and an operation (d) of, when it is determined that the gesture recognition is performed, executing a function corresponding to a recognized gesture.

The operation (c) may include, when the wearable device is located in a preset region, not performing the gesture recognition based on the motion information.

The operation (c) may include, when the wearable device approaches the preset region, determining whether the first body part grips a designated part in the preset region on the basis of the motion information, and which may include, when it is determined that the first body part grips the designated part, not performing the gesture recognition based on the motion information thereafter.

The gesture recognition method according to the present invention may further include an operation (e) of, when the wearable device is located in the preset region, charging a battery of the wearable device through a power transmission circuit.

The operation (d) may include identifying an emotional state in consideration of biometric information of a user obtained from the wearable device and controlling the function to be executed differently according to the emotional state.

The operation (d) may include determining a target device to be controlled according to a result of tracking a gaze of a user and controlling the function corresponding to the recognized gesture to be executed on the target device to be controlled.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above-described objects and other objects, advantages, and features of the present invention and methods of achieving the same will be clearly understood with reference to the accompanying drawings and the following detailed embodiments.

However, the present invention is not limited to the embodiments to be disclosed but may be implemented in various different forms. The following embodiments are provided in order to inform those skilled in the art of the present invention of objects, configurations, and effects of the present invention. The scope of the present invention is defined by the appended claims.

Meanwhile, the terms used in the embodiments of the present invention are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations, and/or elements, but do not preclude the presence or addition of one or more other components, steps, operations, and/or elements.

Figure 1:
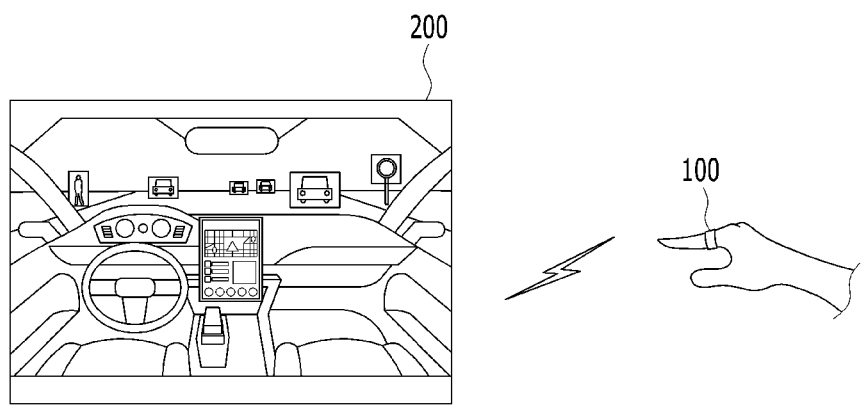
FIG. 1 illustrates a gesture recognition system according to the present invention.

FIG. 1 illustrates a gesture recognition system according to the present invention.

A gesture recognition system according to an embodiment of the present invention includes a wearable device 100 and a gesture recognition apparatus 200.

The wearable device 100 has, for example, a shape of a ring worn on a finger of a user.

The wearable device 100 detects a hand motion of the user and transmits motion information to the gesture recognition apparatus 200.

Alternatively, the gesture recognition apparatus 200 detects a motion of the wearable device 100 to obtain information about the motion of the wearable device 100.

The gesture recognition apparatus 200 is included in a vehicle system or communicates with the vehicle system.

The gesture recognition apparatus 200 receives motion information from the wearable device 100 and recognizes the user's gesture on the basis of the motion information.

The gesture recognition apparatus 200 controls the vehicle system according to the recognized user's gesture.

The gesture recognition apparatus 200 recognizes a region in which the wearable device 100 is located on the basis of wireless communication or a captured image and determines whether or not to recognize the gesture according to the recognized region.

When the wearable device 100 is located in a first region (e.g., an active region), the gesture recognition apparatus 200 executes a function corresponding to the recognized gesture on the basis of the motion information.

When the wearable device 100 is located in a second region (e.g., an inactive region or a semi-active region), the gesture recognition apparatus 200 executes at least one of an operation i) of ignoring the motion information, an operation ii) of executing another designated function (e.g., a wireless charging function or a specific function of the vehicle system), and an operation iii) of recognizing the gesture by converting reference coordinates of the motion information.

The first region is a partial region that is different from the second region or the remaining region except for the second region.

The second region is a region located within a first distance from at least one of a steering wheel, a gear rod, and an armrest.

When the gesture recognition apparatus 200 detects gripping of the steering wheel or the gear rod in the second region on the basis of the motion information, the gesture recognition apparatus 200 executes at least one of the operation i) of ignoring the motion information, the operation ii) of executing another designated function (e.g., the wireless charging function or the specific function of the vehicle system), and the operation iii) of recognizing the gesture by converting the reference coordinates of the motion information, which are described above.

The gesture recognition apparatus 200 may execute another function with respect to the same gesture in the first region.

For example, the gesture recognition apparatus 200 identifies an emotional state of the user on the basis of biometric information of the user detected through the wearable device 100 and executes another function with respect to the same gesture according to the identified emotional state.

Further, the gesture recognition apparatus 200 executes another function with respect to the same gesture according to whether the user touches the wearable device 100.

Further, the gesture recognition apparatus 200 determines a target device to be controlled on the basis of a position of the wearable device 100 and executes another function with respect to the same gesture according to the determined target device to be controlled.

The gesture recognition apparatus 200 tracks a gaze of the user who wears the wearable device 100 using a camera, determines a target device to be controlled on the basis of the tracked gaze, and allows the determined target device to be controlled to execute a function corresponding to the recognized gesture.

However, when the user who wears the wearable device 100 is a driver of a vehicle, a process of securing a driving field of view and a process of looking at the target device to be controlled may be mixed.

The gesture recognition apparatus 200 according to the present invention selectively tracks the gaze of the user to determine the target device to be controlled only when a designated input is checked, such as when a designated gesture is recognized through the wearable device 100.

Alternatively, the gesture recognition apparatus 200 selectively determines the target device to be controlled only when information about the gaze of the user looking at the target device to be controlled (e.g., an air conditioner) that does not overlap the driving field of view is obtained.

The gesture recognition apparatus 200 recognizes the user's gesture through the wearable device 100 and checks the position of the wearable device 100 through a communication circuit (e.g., ultra-wideband (UWB) communication-based positioning technology).

The gesture recognition apparatus 200 grants or restricts the right to control some target devices to be controlled among a plurality of target devices to be controlled (e.g., a vehicle control, an infotainment device, and an air conditioner) according to the position of the user.

The gesture recognition apparatus 200 recognizes a gesture of another user who does not wear the wearable device 100 using an in-vehicle camera, and the gesture recognition apparatus 200 executes a function of the target device to be controlled that corresponds to the recognized gesture.

The gesture recognition apparatus 200 checks user information (e.g., age information) of the wearable device 100 on the basis of an identification number assigned to the wearable device 100 and restricts some functions of each target device to be controlled according to the user information (e.g., age restriction according to the content to be played).

When the gesture recognition apparatus 200 recognizes the gesture using the wearable device 100, the gesture recognition apparatus 200 provides a function corresponding to the recognized gesture differently according to the position of the wearable device 100, the position of the user, the gaze of the user, the user information (e.g., the age information), or the target device to be controlled.

When the wearable device 100 worn by the user accompanies a motion for driving such as a motion for a steering wheel, a gear rod, or an armrest, the gesture recognition apparatus 200 does not recognize the user's gesture so that the user' motion for driving is not recognized as a gesture.

Figure 2:
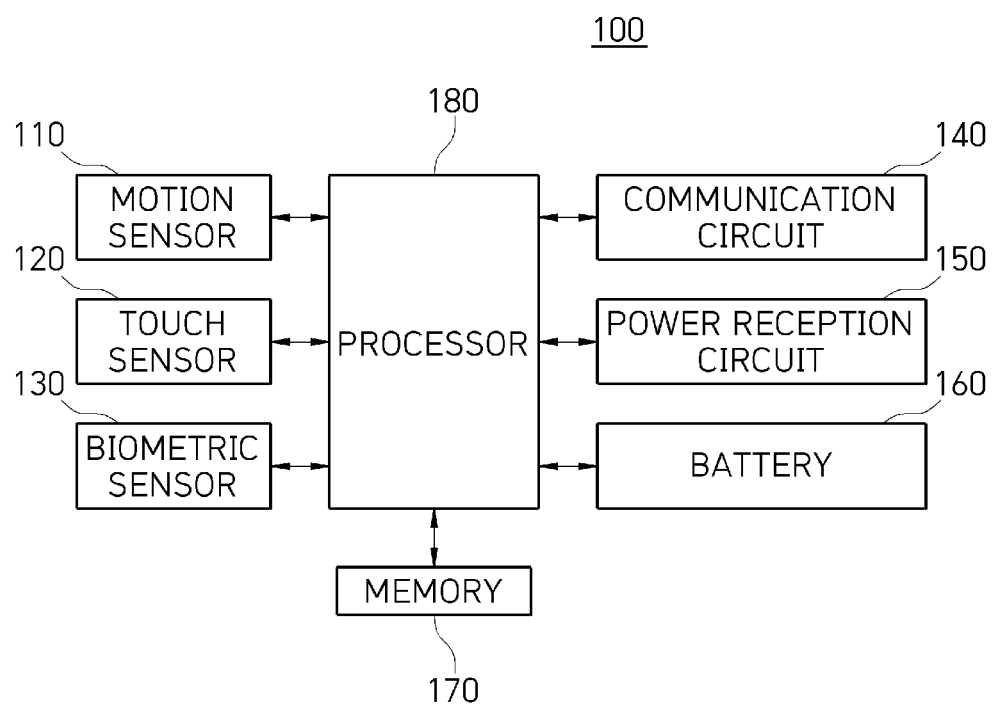
FIG. 2 illustrates a wearable device according to the present invention.

FIG. 2 illustrates the wearable device according to the present invention.

The wearable device 100 includes a motion sensor 110, a touch sensor 120, a biometric sensor 130, a communication circuit 140, a power reception circuit 150, a battery 160, a memory 170, and a processor 180.

The motion sensor 110 includes at least one of a magnetic sensor, a gyro sensor, an acceleration sensor, and a 3-axis inertial sensor and detects the user's motion.

The touch sensor 120 detects a user's touch on the wearable device 100.

The biometric sensor 130 detects a biometric signal of the user, such as a pulse or the like.

The communication circuit 140 establishes a wired and/or wireless communication channel between the wearable device 100 and another device and supports communication through the communication channel.

The communication channel is, for example, a channel of a communication method such as UWB, Bluetooth, WiFi, wireless broadband (WiBro), third-generation (3G), or fourth-generation (4G) communication.

The power reception circuit 150 receives power from an external electronic device to charge the battery 160.

The memory 170 stores a user motion recognition program, and the processor 180 performs data processing by executing the user motion recognition program.

The processor 180 establishes a communication channel with the gesture recognition apparatus 200 through the communication circuit 140 and transmits or receives data to or from the gesture recognition apparatus 200 through the established communication channel.

The processor 180 transmits motion information, touch-related information, and biometric information of the wearable device 100 to the gesture recognition apparatus 200 through the established communication channel and receives wireless power.

The processor 180 detects the motion of the wearable device 100 through the motion sensor 110 to generate motion information and transmits the motion information to the gesture recognition apparatus 200 through the communication circuit 140.

Since the wearable device 100 is worn on a specific body part (e.g., a finger) of the user, the motion information is related to a motion of the specific body part.

In order to aid the understanding of those skilled in the art, an example in which the wearable device 100 is a ring-shaped device that is inserted into the finger of the user and the motion information is related to the motion of the finger will be described.

The processor 180 detects the user's touch on the wearable device 100 through the touch sensor 120 to generate touch-related information and transmits the touch-related information to the gesture recognition apparatus 200 through the communication circuit 140.

The processor 180 detects the user's biometric signal (e.g., a pulse) through the biometric sensor 130 to generate biometric information and transmits the biometric information to the gesture recognition apparatus 200 through the communication circuit 140.

The processor 180 receives power from the gesture recognition apparatus 200 through the power reception circuit 150 in a wireless manner and charges the battery 160 using the received power.

The wearable device 100 supports a gesture-based user interface by generating motion information of the finger of the user and transmitting the motion information of the finger of the user to the gesture recognition apparatus 200.

Figure 3:
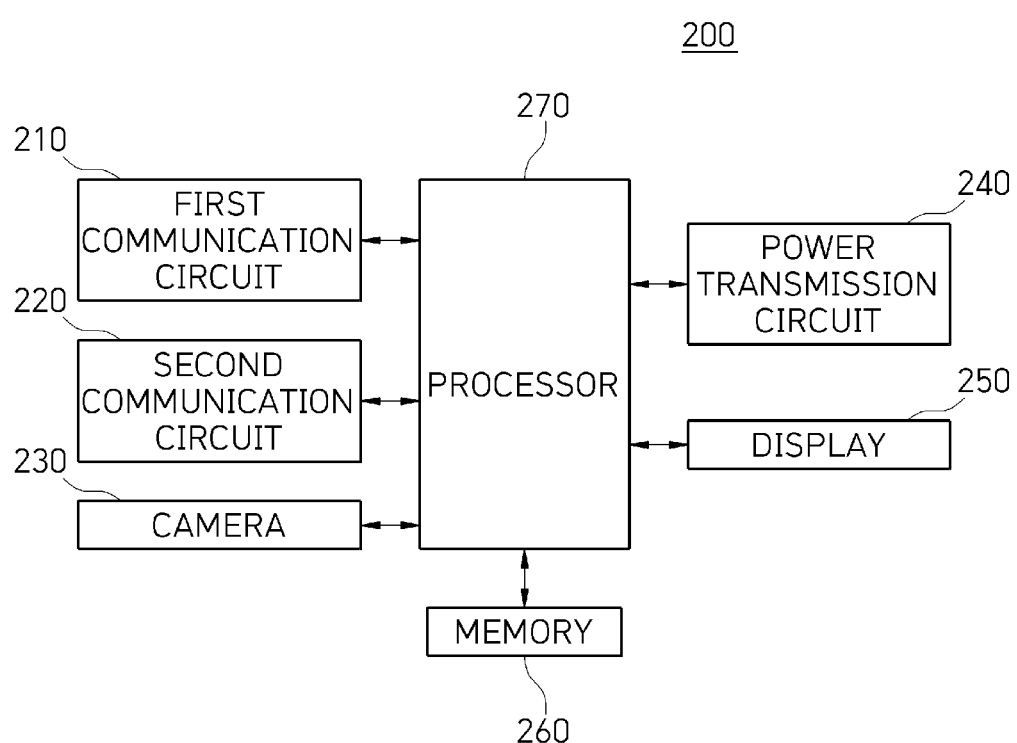
FIG. 3 illustrates a gesture recognition apparatus according to the present invention.

FIG. 3 illustrates the gesture recognition apparatus according to the present invention.

The gesture recognition apparatus 200 includes a first communication circuit 210, a second communication circuit 220, a camera 230, a display 250, a power transmission circuit 240, a memory 260, and a processor 270.

The gesture recognition apparatus 200 is included in a control module of the vehicle system.

The first communication circuit 210 establishes a wired and/or wireless communication channel between the gesture recognition apparatus 200 and another device and supports communication through the communication channel.

The communication channel is, for example, a channel of a communication method such as UWB, Bluetooth, WiFi, WiBro, 3G, or 4G communication.

The first communication circuit 210 includes a plurality of communication circuits each mounted in a corresponding one of a plurality of vehicle regions.

The second communication circuit 220 establishes a communication channel between the gesture recognition apparatus 200 and the vehicle system (e.g., a vehicle control module, an air conditioner, or an infotainment device) and supports communication through the established communication channel.

The communication channel is, for example, a channel of a communication method such as a controller area network (CAN) or media oriented system transport (MOST).

The camera 230 photographs a gaze of a driver and photographs a gesture of a fellow passenger other than the driver.

The display 250 outputs content (e.g., icons, text, images) under the control of the processor 270 and includes a head up display (HUD), a liquid crystal display (LCD), a light-emitting diode (LED) display, or an organic light-emitting diode (OLED) display.

The memory 260 stores a gesture recognition program, and the processor 270 executes the gesture recognition program.

The processor 270 establishes a communication channel with the wearable device 100 through the first communication circuit 210 and transmits or receives data to or from the wearable device 100 through the established communication channel.

The processor 270 receives motion information, touch-related information, and biometric information from the wearable device 100 through the first communication circuit 210.

When the processor 270 receives the motion information from the wearable device 100, the processor 270 recognizes the gesture of the user of the wearable device 100 on the basis of the motion information.

When the processor 270 recognizes the user's gesture, the processor 270 requests execution of a function corresponding to the recognized gesture from at least one target device to be controlled in the vehicle system through the second communication circuit 220.

The processor 270 recognizes a gesture of an occupant in the vehicle on the basis of an image captured by the camera 230.

The processor 270 determines whether the gesture is to be recognized, is not to be recognized, or is to be converted and recognized according to a region in which the wearable device 100 is located on the basis of the motion information.

When it is determined that the wearable device 100 is located in a first region (e.g., an active region), the processor 270 transmits a command to execute a function corresponding to the recognized gesture on the basis of the motion information.

When it is determined that the wearable device 100 is located in a second region (e.g., an inactive region or a semi-active region), the processor 270 transmits a command to execute at least one of an operation i) of ignoring the motion information, an operation ii) of executing another designated function (e.g., a wireless charging function or a specific function of the vehicle system), and an operation iii) of recognizing the gesture by converting reference coordinates of the motion information.

As described above, the second region becomes a region which is preset based on the steering wheel, the gear rod, or the armrest.

When it is determined that the wearable device 100 approaches the steering wheel or the gear rod, the processor 270 determines whether the user grips the steering wheel or the gear rod on the basis of the motion information, and the processor 270 transmits a command to execute at least one of the functions i) to iii) described above.

The processor 270 wirelessly charges the wearable device 100 through the power transmission circuit 240.

The power transmission circuit 240 is disposed in at least one region of the steering wheel and the gear rod.

The processor 270 charges the battery 160 of the wearable device 100 by controlling the power to be wirelessly transmitted from the power transmission circuit 240 to the power reception circuit 150 of the wearable device 100 according to the position of the wearable device 100.

The processor 270 executes another function with respect to the same gesture recognized through the wearable device 100.

The processor 270 identifies an emotional state of the user on the basis of the biometric information of the user detected through the wearable device 100 and executes another function with respect to the same gesture according to the identified emotional state.

The processor 270 executes another function with respect to the same gesture according to whether the wearable device 100 is touched by the user.

The processor 270 determines a target device to be controlled of the vehicle system on the basis of the position of the wearable device 100 and executes another function with respect to the same gesture according to the determined target device to be controlled.

The processor 270 tracks the gaze of the user using the camera 230 and determines the target device to be controlled of the vehicle system on the basis of the tracked gaze.

The processor 270 controls the determined target device to be controlled to execute a function corresponding to the recognized gesture.

When the user is a driver of a vehicle, a process of securing a driving field of view and a process of selecting a target device to be controlled may be mixed.

The processor 270 selectively determines the target device to be controlled on the basis of the gaze of the user only when a designated input is checked, such as when a designated gesture is recognized through the wearable device 100.

Alternatively, the processor 270 selectively determines the target device to be controlled on the basis of the gaze of the user only when the gaze of the user looking at the target device to be controlled (e.g., the air conditioner) that does not overlap the driving field of view is checked.

When the processor 270 recognizes the user's gesture on the basis of the wearable device 100, the processor 270 checks the position of the user through the first communication circuit 210 or the camera 230.

The processor 270 may check the position of the wearable device 100 through the first communication circuit 210 or check the position of the wearable device 100 or the user by analyzing the image captured by the camera 230.

When the processor 270 checks the position of the wearable device 100 or the user, the processor 270 grants or restricts the right to control some target devices to be controlled among a plurality of target devices to be controlled (e.g., a vehicle control device, an infotainment device, and an air conditioner) according to the checked position.

The processor 270 recognizes a gesture of a fellow passenger who does not wear the wearable device 100 using the camera 230 and controls the target device to be controlled to execute a function of corresponding to the recognized gesture.

The processor 270 checks user information (e.g., age information) of the wearable device 100 on the basis of an identification number assigned to the wearable device 100 and restricts some functions of each target device to be controlled according to the user information (e.g., age restriction according to the content to be played).

When the processor 270 recognizes the gesture through the wearable device 100, the processor 270 provides a function corresponding to the recognized gesture differently according to the position of the wearable device 100, the position of the user, the gaze of the user, the user information (e.g., age information), or the target device to be controlled.

When the wearable device 100 worn by the user accompanies a motion for driving such as a motion for a steering wheel, a gear rod, or an armrest, the processor 270 does not recognize the gesture and thus the motion for driving is not recognized as a gesture input for function execution.

Figure 4:
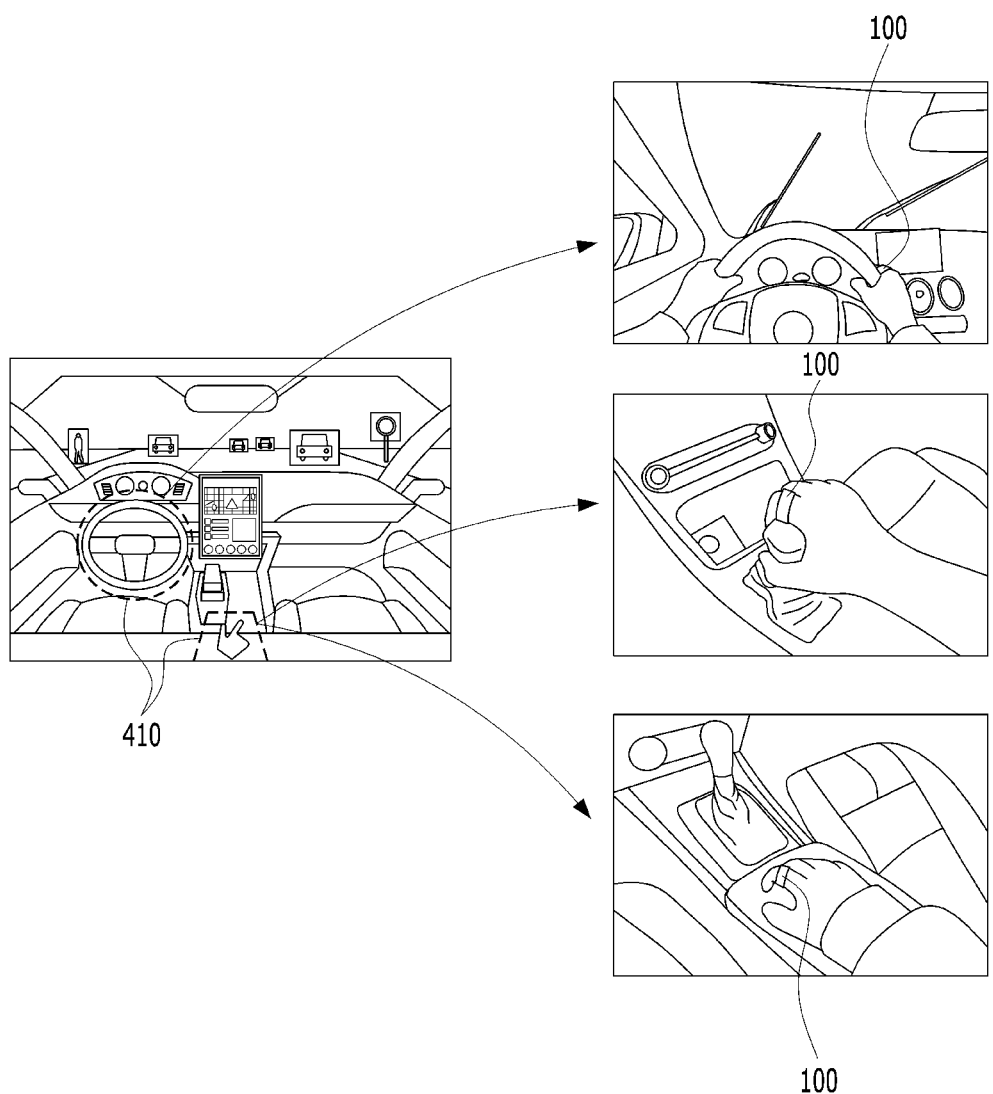
FIG. 4 illustrates an example of a gesture recognition/nonrecognition region according to the present invention.

FIG. 4 illustrates an example of a gesture recognition/nonrecognition region according to the present invention.

The gesture recognition apparatus 200 determines whether the wearable device 100 is located in the first region (e.g., the active region) or the second region (e.g., the inactive region or the semi-active region) and recognizes or does not recognize the gesture on the basis of the motion information according to the region (e.g., the first region or the second region) in which the recognized wearable device 100 is located.

The second region includes a steering wheel, a gear rod, or an armrest region, and the first region is defined as a region except for the second region.

When the gesture recognition apparatus 200 establishes the communication channel with the wearable device 100 through the first communication circuit 210, the gesture recognition apparatus 200 identifies the position of the wearable device 100 periodically or identifies the position of the wearable device 100 by receiving data from the wearable device 100.

The gesture recognition apparatus 200 identifies the position of the wearable device 100 by identifying a distance to the wearable device 100 through a plurality of communication circuits which are spaced apart from each other and provided in a plurality of vehicle regions.

The plurality of vehicle regions include, for example, an inner corner, a steering wheel, a gear rod, and an armrest region of the vehicle.

When it is determined that the wearable device 100 is located in the first region, the gesture recognition apparatus 200 recognizes the user's gesture on the basis of the motion information received from the wearable device 100.

When the gesture recognition apparatus 200 recognizes the gesture, the gesture recognition apparatus 200 determines a function corresponding to the recognized gesture and directly executes the determined function or requests execution of the determined function from the target device to be controlled in the vehicle system.

When it is determined that the wearable device 100 is located in the second region, the gesture recognition apparatus 200 ignores the motion information received from the wearable device 100 and does not execute the gesture recognition based on the motion information.

Figure 5:
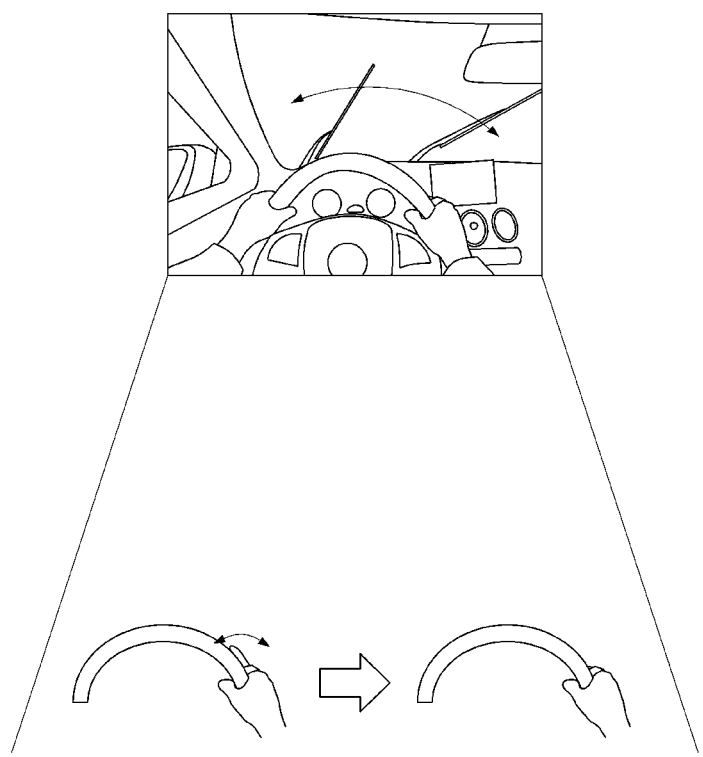
FIG. 5 illustrates gesture recognition in a second region according to the present invention.

FIG. 5 illustrates gesture recognition in the second region according to the present invention.

Referring to FIG. 5, when it is determined that the wearable device 100 is located in the steering wheel region corresponding to the second region, the gesture recognition apparatus 200 receives motion information from the wearable device 100 and selectively recognizes only a designated gesture on the basis of the motion information.

The gesture recognition apparatus 200 detects that a finger (e.g., an index finger) of the user on which the wearable device 100 is worn grips or touches the steering wheel on the basis of at least one of the motion information received from the wearable device 100 and touch-related information.

After the gesture recognition apparatus 200 detects that the finger of the user grips or touches the steering wheel, when the gesture recognition apparatus 200 detects the designated gesture, the gesture recognition apparatus 200 controls a designated function corresponding to the designated gesture to be executed.

The gesture recognition apparatus 200 recognizes the designated gesture, in which the finger of the user is unfolded, shaken lateral, and then folded again, within a specified period of time on the basis of the motion information received from the wearable device 100 that grips or touches the steering wheel and, accordingly, operates the wiper of the vehicle.

Figure 6:
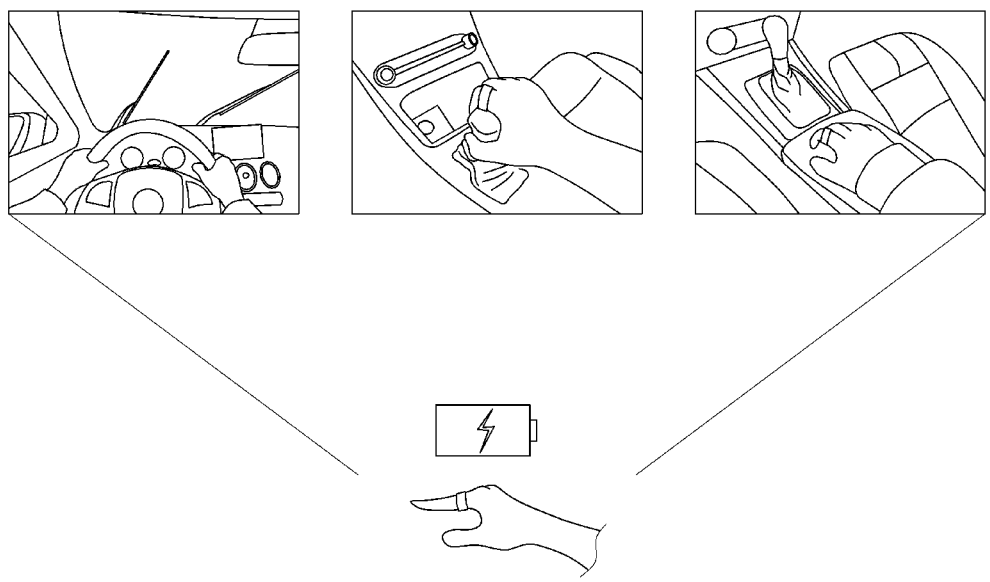
FIG. 6 illustrates an example of executing another function in the second region according to the present invention.

FIG. 6 illustrates an example of executing another function in the second region according to the present invention.

Referring to FIG. 6, when it is determined that the wearable device 100 is located in the second region (e.g., the steering wheel, the gear rod, or the armrest region), the gesture recognition apparatus 200 transmits power to the wearable device 100 to charge the wearable device 100.

Figure 7:
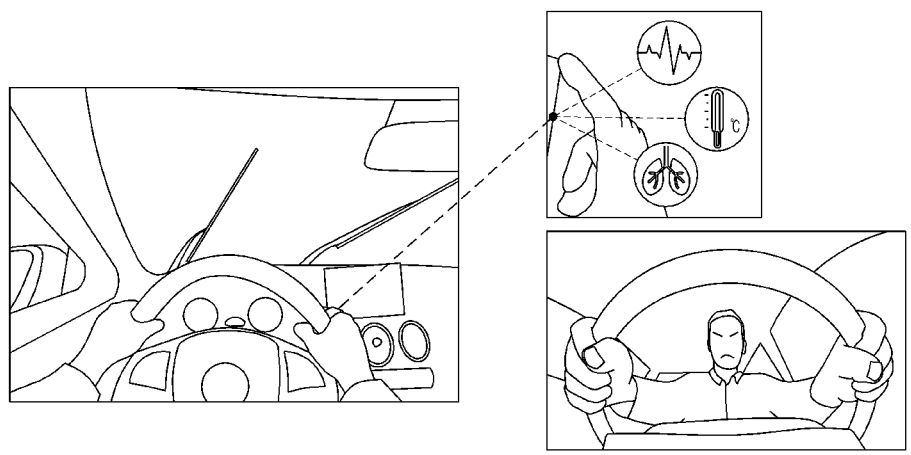
FIG. 7 illustrates vehicle control based on biometric information and motion information according to the present invention.

FIG. 7 illustrates vehicle control based on biometric information and motion information according to the present invention.

The gesture recognition apparatus 200 receives biometric information from the wearable device 100 and identifies the emotional state of the user on the basis of the biometric information.

The gesture recognition apparatus 200 receives pulse information as the biometric information and checks whether the emotional state of the user corresponds to an anger/excitement state or a normal state on the basis of the pulse information.

The gesture recognition apparatus 200 determines that the emotional state of the user is an anger/excitement state when a pulse rate is greater than a threshold, and that the emotional state of the user is a normal state when the pulse rate is less than or equal to the threshold.

The gesture recognition apparatus 200 controls another function to be executed with respect to the same gesture according to the determined emotional state.

A first gesture is mapped to a first function (e.g., restriction of gesture-based vehicle operation-related control and allowance of infotainment function) related to a first emotional state (e.g., the anger/excitement state) and to a second function (e.g., allowance of vehicle operation-related control) related to a second emotional state (e.g., the normal state).

When the gesture recognition apparatus 200 recognizes the first gesture mapped to a next song playback function and a vehicle driving-related control function on the basis of the motion information, the gesture recognition apparatus 200 determines whether the emotional state of the user is the anger/excitement state or the normal state on the basis of the biometric information.

As a result of recognition of the first gesture, when it is determined that the emotional state of the user is the anger/excitement state, the gesture recognition apparatus 200 restricts the vehicle driving-related control function corresponding to the first gesture.

When it is determined that the emotional state of the user is the normal state, the gesture recognition apparatus 200 executes the vehicle driving-related control function corresponding to the first gesture.

The gesture recognition apparatus 200 may determine whether the emotional state of the user is the anger/excitement state or the normal state in response to the first gesture mapped to the next song playback function.

As the result of recognition of the first gesture, when it is determined that the emotional state of the user is the anger/excitement state, the gesture recognition apparatus 200 plays music to change the mood as the next song according to the setting or plays the next song after the currently playing song.

The gesture recognition apparatus 200 changes the color of a vehicle mood lamp according to the emotional state of the user in response to the first gesture mapped to a mood lamp lighting function.

The gesture recognition apparatus 200 photographs the user's face using the camera 230 and identifies the emotional state of the user by analyzing the user's facial expression in the captured image.

The gesture recognition apparatus 200 controls the target device to be controlled in the vehicle system on the basis of the determined emotional state.

When the gesture recognition apparatus 200 checks at least one of a user's pleasant expression, facial movement, or hand movement in the captured image while playing music, the gesture recognition apparatus 200 determines that the emotional state of the user is a pleasant state.

When it is determined that the emotional state of the user while playing music is the pleasant state, the gesture recognition apparatus 200 provides an equalizing effect using vehicle mood lighting.

Figure 8:
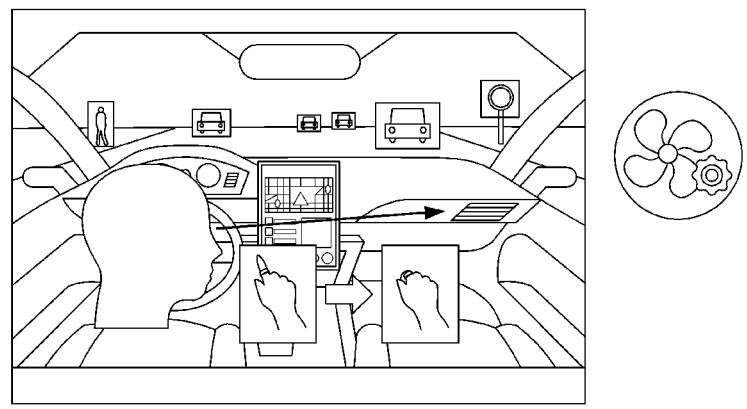
FIG. 8 illustrates vehicle control based on gesture and gaze tracking according to the present invention.

FIG. 8 illustrates vehicle control based on gesture and gaze tracking according to the present invention.

The gesture recognition apparatus 200 tracks the gaze of the user corresponding to an object of gesture recognition using the camera 230 and determines the target device to be controlled of the vehicle system on the basis of the tracked gaze.

The gesture recognition apparatus 200 recognizes the gaze of the user looking at the air conditioner using the camera 230 and recognizes the second gesture through the wearable device 100.

The gesture recognition apparatus 200 determines that the target device to be controlled of the second gesture mapped to the plurality of functions (controlling of the specific function of the air conditioner and controlling of another device) is the air conditioner.

When it is determined that the target device to be controlled of the second gesture is the air conditioner, the gesture recognition apparatus 200 executes a function (e.g., power on or off) corresponding to the second gesture on the air conditioner.

Figure 9:
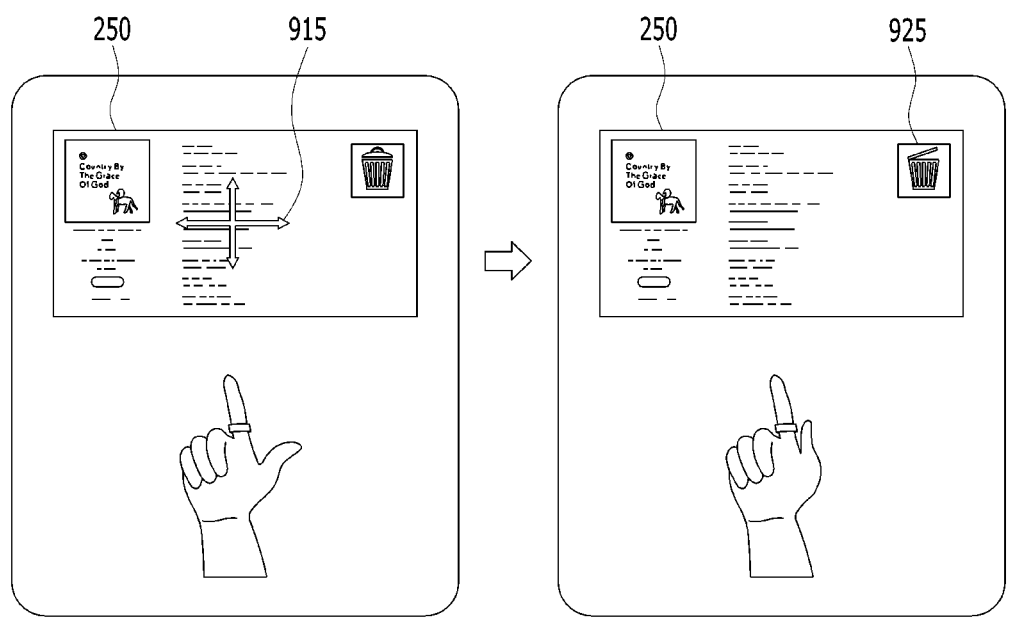
FIG. 9 illustrates vehicle control based on touch-related information and motion information.

FIG. 9 illustrates vehicle control based on touch-related information and motion information.

The gesture recognition apparatus 200 executes another function with respect to the same gesture according to whether the user touches the wearable device 100.

The gesture recognition apparatus 200 recognizes a third gesture from the motion information received from the wearable device 100 and determines whether the finger of the user touches the wearable device 100 from the touch-related information received from the wearable device 100.

When the gesture recognition apparatus 200 recognizes the third gesture (e.g., a drag gesture in a first direction) in a state in which the finger of the user does not touch the wearable device 100, the gesture recognition apparatus 200 executes a first function among a plurality of functions mapped to the third gesture, for example, a position movement function 915 of the content displayed on the display 250.

When the gesture recognition apparatus 200 recognizes the third gesture (e.g., the drag gesture in the first direction) in a state in which the finger of the user touches the wearable device 100, the gesture recognition apparatus 200 executes a second function among the plurality of functions mapped to the third gesture, for example, a wastebasket activation function 925 or an icon deletion function displayed on the display 250.

Figure 10:
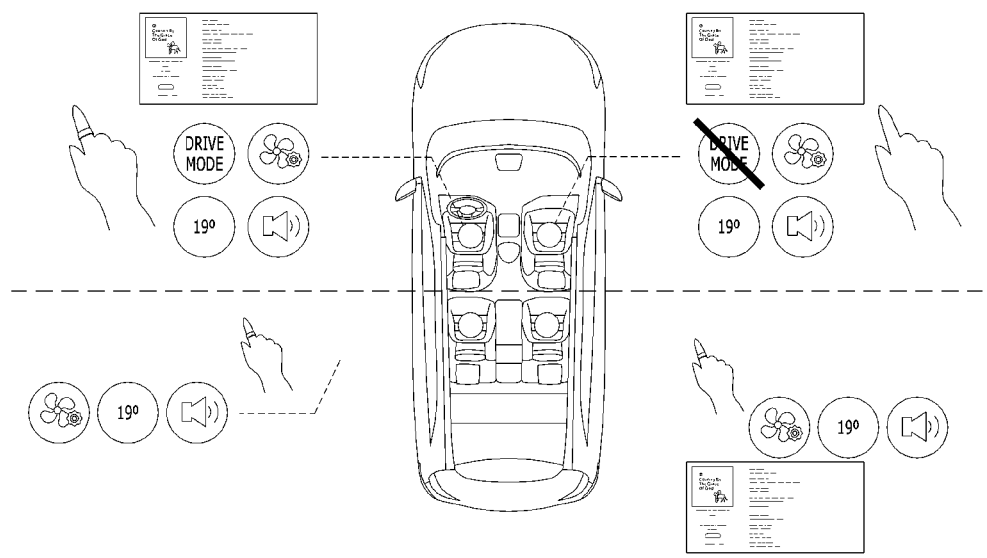
FIGS. 10 and 11 illustrate target devices to be controlled for each user position according to the present invention.
Figure 11:
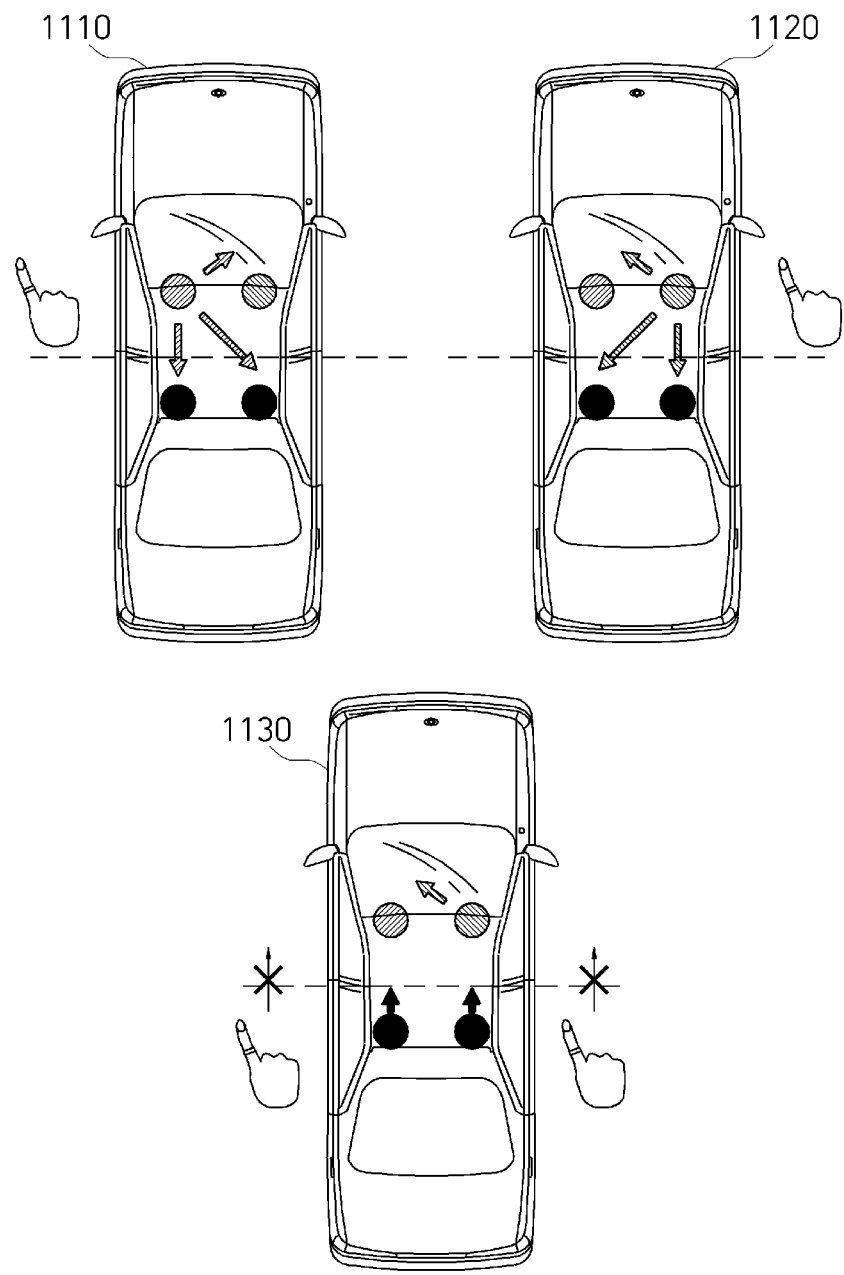

FIGS. 10 and 11 illustrate target devices to be controlled for each user position according to the present invention.

The gesture recognition apparatus 200 performs gesture-based vehicle system control according to whether the wearable device 100 is worn and according to the position of the occupant in the vehicle.

The gesture recognition apparatus 200 grants all of the gesture-based right to control the vehicle system to the driver's seat occupant who wears the wearable device 100.

For example, the gesture recognition apparatus 200 grants the right to control vehicle driving (e.g., an advanced smart cruise control (ASCC) setting function, an inter-vehicle interval setting function, a drive mode setting function, and an advanced driver assistance system (ADAS) setting function), the right to control the infotainment device (e.g., volume) for all seats, and the right to control the air conditioners of all seats.

The gesture recognition apparatus 200 grants the right to control the infotainment device (e.g., volume) for a front seat and the right to control the air conditioner for a front seat to an occupant in an auxiliary seat who wears the wearable device 100.

The gesture recognition apparatus 200 grants the right to control the infotainment device (e.g., volume) for a rear seat and the right to control the air conditioner for a rear seat to an occupant in the rear seat who wears the wearable device 100.

The gesture recognition apparatus 200 grants the right to control the infotainment device (e.g., volume) for the front or rear seat to an occupant who does not wear the wearable device 100 according to whether the corresponding occupant is seated in the front seat or the rear seat.

The gesture recognition apparatus 200 receives an identification number of the wearable device 100 from the wearable device 100 and checks the age information of the user (e.g., the age) of the wearable device 100 corresponding to the received identification number on the basis of relationship information corresponding thereto.

The gesture recognition apparatus 200 restricts the right to control the vehicle system, for example, content playable by the infotainment device, on the basis of the age information of the user.

When the user is a child/infant, the gesture recognition apparatus 200 allows content related to children/infants to be played and restricts the playback of the content related to adolescents or adults.

The gesture recognition apparatus 200 checks the position of the occupant who wears the wearable device 100 through the first communication circuit 210.

The first communication circuit 210 includes a circuit for performing UWB communication, and the gesture recognition apparatus 200 checks the position of the occupant who wears the wearable device 100 on the basis of a distance between the plurality of circuits and the wearable device 100.

The gesture recognition apparatus 200 further uses an image captured by the camera 230 to check the position of the occupant who wears the wearable device 100.

The gesture recognition apparatus 200 checks the position of the occupant who does not wear the wearable device 100 in the vehicle using the camera 230.

The gesture recognition apparatus 200 recognizes the gesture of the occupant on the basis of at least one of the motion information received from the wearable device 100 and the image captured by the camera 230.

When the gesture recognition apparatus 200 recognizes the gesture using the wearable device 100 or the camera 230, the gesture recognition apparatus 200 may perform a control corresponding to the recognized gesture on the target device to be controlled for which the right to control is granted.

The gesture recognition apparatus 200 provides the right of the control different from the right of the control for the target device to be controlled according to whether the occupant in the vehicle who makes the recognized gesture is the user (or, the wearer) of the wearable device 100.

The gesture recognition apparatus 200 provides the right to control a greater number of types of target devices to be controlled than the non-wearing user or provides all of the right to control vehicle driving to the user of the wearable device 100.

When the position of the occupant who makes the gesture is the driver's seat, the gesture recognition apparatus 200 determines whether the occupant is the user of the wearable device 100.

When it is determined that the occupant is the user of the wearable device 100, the gesture recognition apparatus 200 grants all of the right to control the plurality of target devices to be controlled in the vehicle system.

When it is determined that the occupant is not the user of the wearable device 100, the gesture recognition apparatus 200 grants only the right to control some target devices to be controlled in the vehicle system.

When the recognized gesture is for the target device to be controlled that is not allowed, the gesture recognition apparatus 200 ignores the recognized gesture and provides a warning notification.

In response to the recognized gesture, the gesture recognition apparatus 200 informs that the control of the target device to be controlled corresponding to the gesture is not allowed through a speaker or the display 250.

FIG. 12 illustrates transformation of reference coordinates of gesture recognition according to the present invention.

The gesture recognition apparatus 200 determines whether the wearable device 100 is located in the air in the vehicle or located on a designated plane in the vehicle.

The designated plane includes an armrest and a table in the vehicle.

When it is determined that the wearable device 100 is located within a designated distance from an upper end of the designated plane, the gesture recognition apparatus 200 determines that the wearable device 100 is located on the designated plane.

When the gesture recognition apparatus 200 recognizes the gesture on the basis of the motion information received from the wearable device 100, the gesture recognition apparatus 200 recognizes a gesture direction differently according to the motion information when the wearable device 100 is located in the air and when the wearable device 100 is located on the designated plane.

For example, when it is determined that the wearable device 100 is located in the air, the gesture recognition apparatus 200 may determine coordinate values (x, y, z) of the motion information by using a lateral direction, an vertical direction, and a front-rear direction of the vehicle as an x-axis, a y-axis, and a z-axis, respectively.

On the other hand, when it is determined that the wearable device 100 is located on the designated plane, the gesture recognition apparatus 200 determines the coordinate values (x, y, z) of the motion information by swapping at least two of the x-axis, y-axis, and z-axis for each other.

For example, when the wearable device 100 is located on the designated plane, the gesture recognition apparatus 200 determines the (x, y, z) coordinate values of the motion information by using the lateral direction, the front-rear direction, and the vertical direction of the vehicle as the x-axis, the y-axis, and the z-axis, respectively.

Figure 12A:
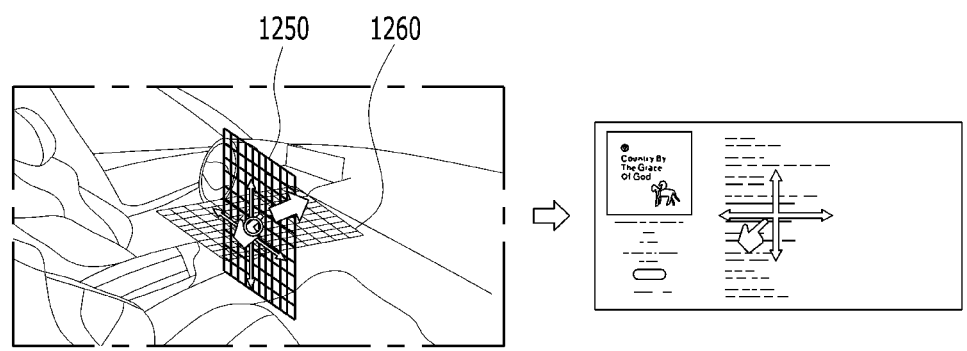
FIGS. 12A and 12B illustrate transformation of reference coordinates of gesture recognition according to the present invention.

Referring to FIG. 12A, the gesture recognition apparatus 200 recognizes a gesture that moves while the wearable device 100 is spaced the first designated distance or more from the armrest and is maintained in a first state in which the wearable device 100 is located in the air.

The gesture recognition apparatus 200 may determine a first coordinate plane 1250 (e.g., an XY plane) as a reference coordinate plane of the gesture in the lateral direction or the vertical direction (see a gray arrow) of the vehicle and determine a second coordinate plane 1260 (e.g., an XZ plane) as a reference coordinate plane of the gesture in the front-rear direction (see a blue arrow) of the vehicle.

When the gesture recognition apparatus 200 recognizes the gesture in the lateral direction or the vertical direction of the vehicle in the first state, the gesture recognition apparatus 200 executes a first function corresponding to the recognized gesture in the lateral direction or the vertical direction, for example, a function of dragging the content displayed on the display 250 in the gesture direction.

When the gesture recognition apparatus 200 recognizes the gesture in the front-rear direction in the first state, the gesture recognition apparatus 200 executes a second function corresponding to the gesture in the front-rear direction, for example, a function of selecting or executing the content on which a cursor is placed among the content displayed on the display 250.

Figure 12B:
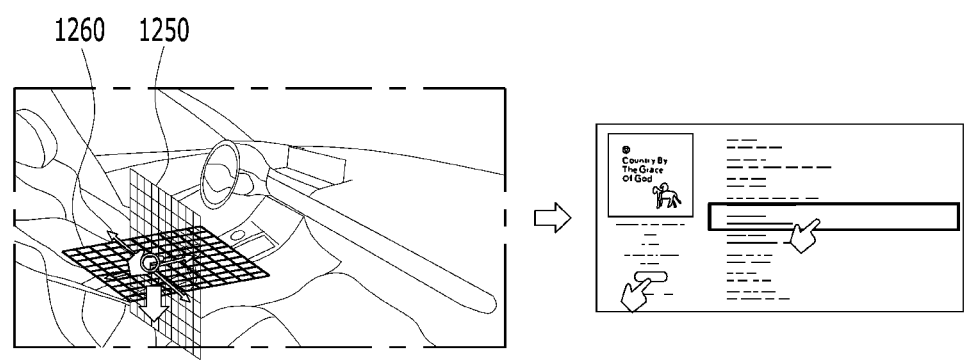

Referring to FIG. 12B, the gesture recognition apparatus 200 recognizes a gesture that moves while the wearable device 100 is located within the first designated distance from the armrest and is maintained in a second state.

The gesture recognition apparatus 200 determines the second coordinate plane 1260 as the reference coordinate plane of the gesture in the lateral direction of the vehicle or the front-rear direction (see the gray arrow) of the vehicle and determines the first coordinate plane 1250 as the reference coordinate plane of the gesture in the vertical direction (see the blue arrow) with respect to the display 250.

When the gesture recognition apparatus 200 recognizes the gesture in the lateral direction of the vehicle or the front-rear direction of the vehicle in the second state, the gesture recognition apparatus 200 executes a first function corresponding to the gesture in the lateral direction or the front-rear direction of the vehicle, for example, a function of dragging the content displayed on the display 250 in the lateral direction or the vertical direction.

When the gesture recognition apparatus 200 recognizes the gesture in the vertical direction in the second state, the gesture recognition apparatus 200 executes a second function corresponding to the gesture in the vertical direction, for example, a function of selecting or executing the content on which a cursor is placed among the content displayed on the display 250.

Figure 13A:
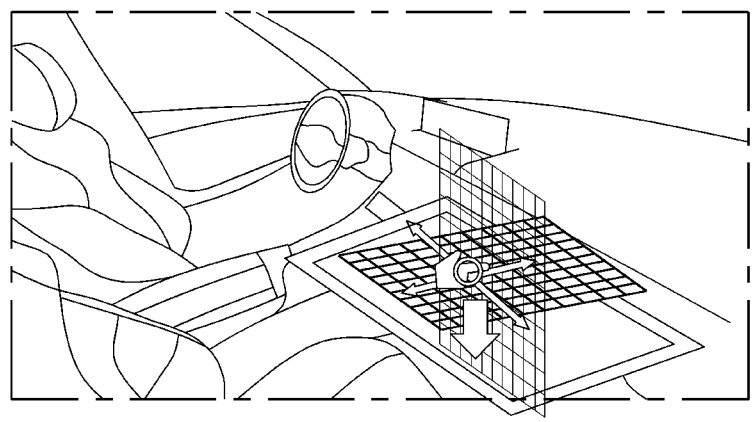
FIGS. 13A and 13B illustrate other examples of the transformation of the reference coordinates of the gesture recognition according to the present invention.
Figure 13B:
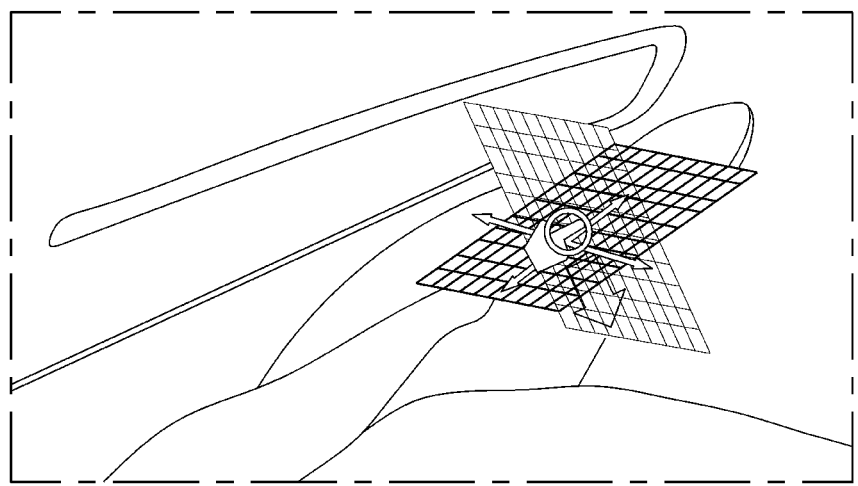

FIGS. 13A and 13B illustrate other examples of the transformation of the reference coordinates of the gesture recognition according to the present invention.

Referring to FIG. 13A, even when the wearable device 100 is located on the table in the vehicle, which corresponds to another flat region in the vehicle, the gesture recognition apparatus 200 recognizes the gesture by converting the reference coordinates as illustrated in FIG. 12.

Referring to FIG. 13B, even when the wearable device 100 is located on a door armrest, the gesture recognition apparatus 200 recognizes the gesture by converting the reference coordinates as illustrated in FIG. 12.

The gesture recognition apparatus 200 recognizes the gesture by converting the reference coordinate plane according to the position of the finger of the user who wears the wearable device 100, and thus supports the vehicle system to be easily controlled according to the position of the finger of the user.

FIGS. 14, and 15A to 15D illustrate function execution according to a position of a wearable device according to the present invention.

Figure 14:
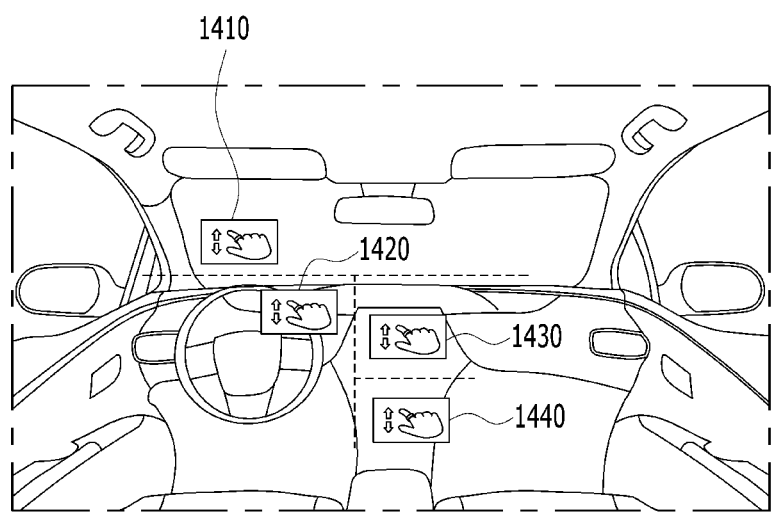
FIGS. 14, and 15A to 15D illustrate function execution according to a position of a wearable device according to the present invention.

Referring to FIG. 14, even when the gesture recognition apparatus 200 recognizes the same gesture, the gesture recognition apparatus 200 executes another function according to the position of the wearable device 100 inside the vehicle.

The vehicle interior region includes a first part 1410 located within a second designated distance (e.g., 10 cm) from an HUD (the display 250) located on an upper end of a steering wheel, a second part 1420 located within a third designated distance (e.g., 3 cm) from the steering wheel, a third part 1430 located within a fourth designated distance (e.g., 3 cm) from an Surround View Monitor (SVM), and a fourth part 1440 located within a fifth designated distance (e.g., 3 cm) from an air conditioner.

The first part 1410 includes the remaining part (or a front seat part of the vehicle) except for the second part 1420, the third part 1430 and the fourth part 1440.

All of the first to fourth parts 1410, 1420, 1430, and 1440 may correspond to the above-described first region or include some of the first region and the second region.

The memory 260 stores information on any one of the first to fourth parts 1410, 1420, 1430, and 1440 corresponding to one gesture and stores a plurality of functions each mapped to each of the target devices to be controlled.

In FIG. 14, when it is determined that the wearable device 100 is located in the first part, the gesture recognition apparatus 200 executes at least one of functions such as enlargement, reduction, and selection of an element displayed on the display 250 in response to the first gesture.

Figure 15A:
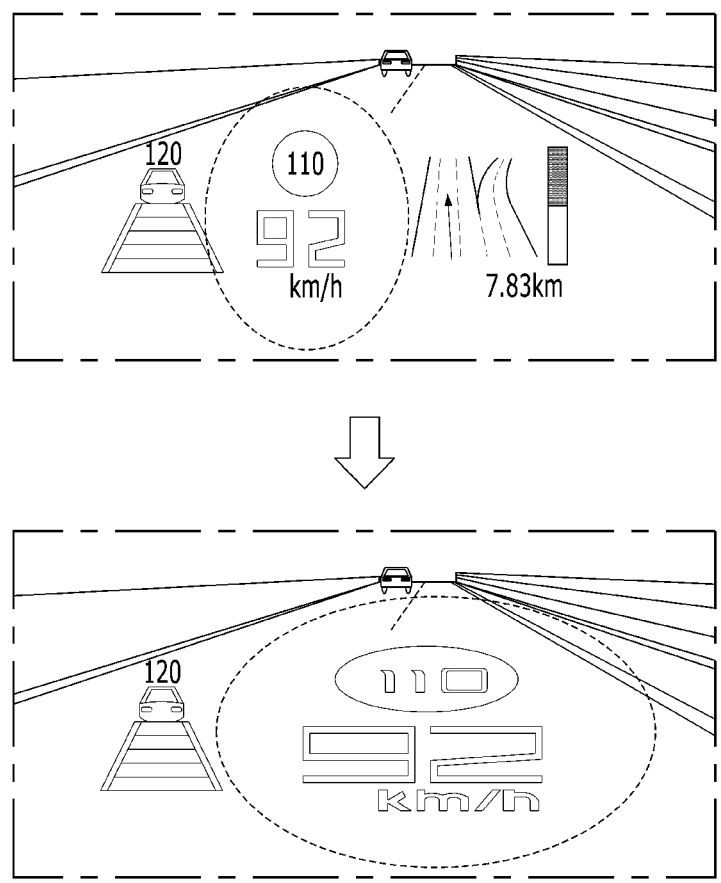

When the gesture recognition apparatus 200 recognizes a pinch out gesture in a state in which the wearable device 100 is located in the first part 1410, the gesture recognition apparatus 200 enlarges a driving information element (e.g., a current speed/speed limit) displayed on the display 250 as illustrated in FIG. 15A in response to the pinch out gesture.

When it is determined that the wearable device 100 is located in the second part, the gesture recognition apparatus 200 executes a vehicle driving-related control function in response to the first gesture.

Figure 15B:
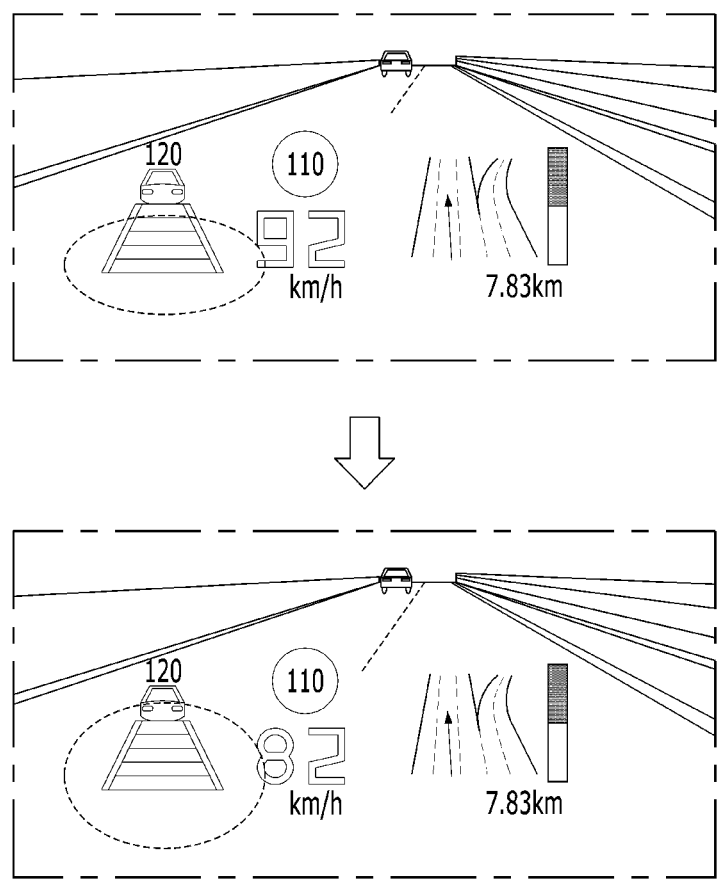

For example, when the gesture recognition apparatus 200 recognizes the pinch out gesture in a state in which the wearable device 100 is located in the second part 1420, the gesture recognition apparatus 200 adjusts a cruise control speed as illustrated in FIG. 15B in response to the pinch out gesture.

Thereafter, the gesture recognition apparatus 200 displays an execution result of the vehicle operation-related control function, for example, the adjusted speed, on the display 250.

When it is determined that the wearable device 100 is located in the third part, the gesture recognition apparatus 200 executes at least one of adjusting a display type of at least one object and selecting a function in response to the first gesture.

Figure 15C:
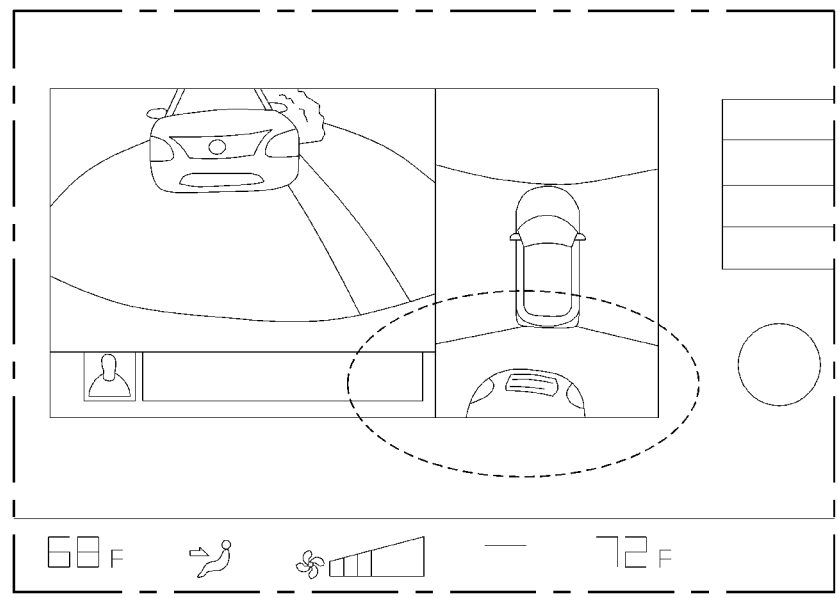
Figure 15C:
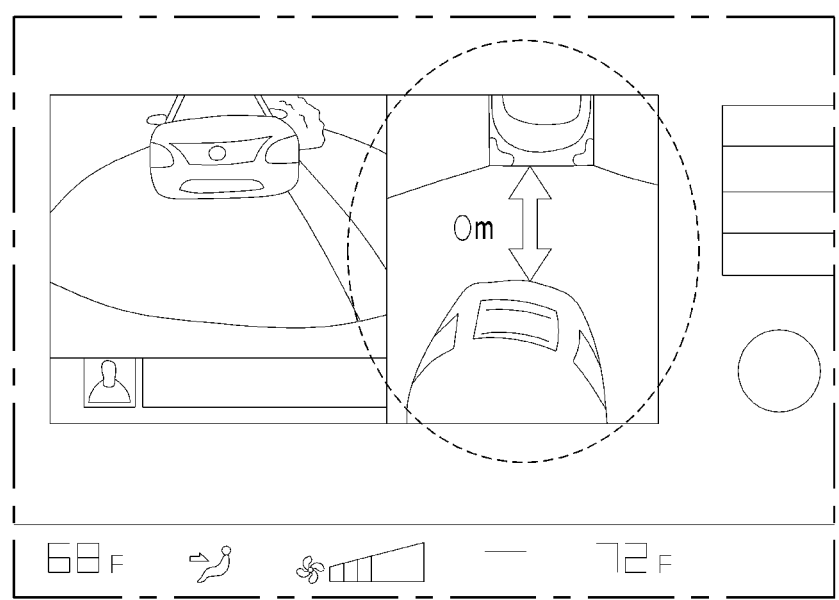

For example, when the gesture recognition apparatus 200 recognizes the pinch out gesture in a state in which the wearable device 100 is located in the third part 1430, the gesture recognition apparatus 200 enlarges a region including a risk factor in the surrounding environment image displayed on the display 250 or enlarges a map of a current position in the navigation system as illustrated in FIG. 15C in response to the pinch out gesture.

When it is determined that the wearable device 100 is located in the fourth part, the gesture recognition apparatus 200 executes a control function related to the air conditioner in response to the first gesture.

Figure 15D:
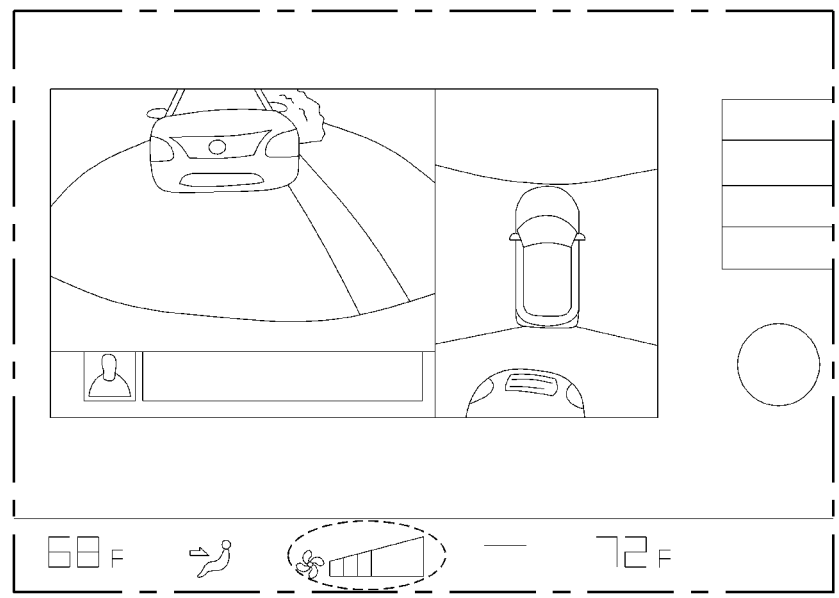
Figure 15D:
Figure 15D:
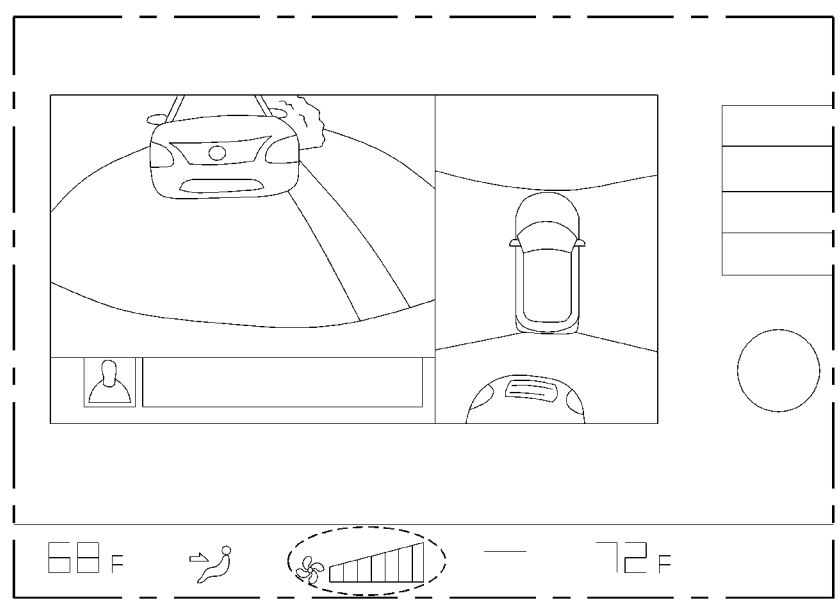
Figure 16:
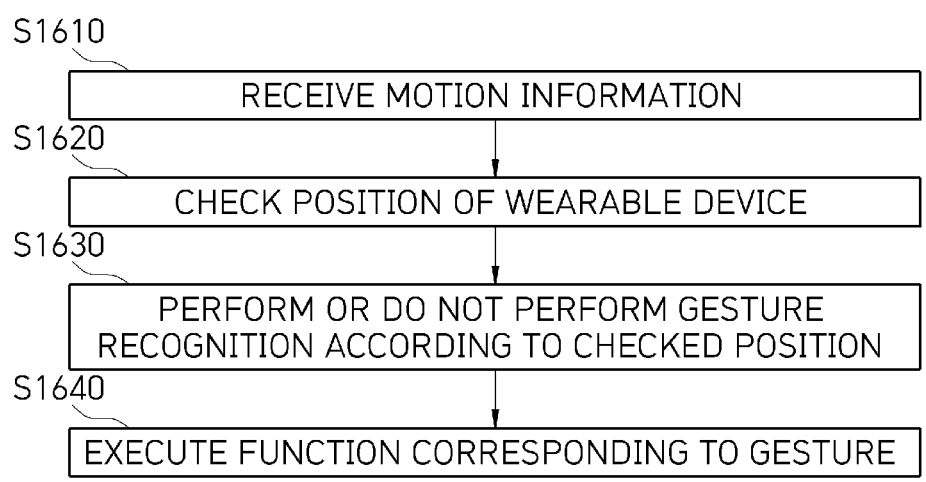
FIGS. 16 to 19 illustrate a gesture recognition method according to the present invention.
Figure 17:
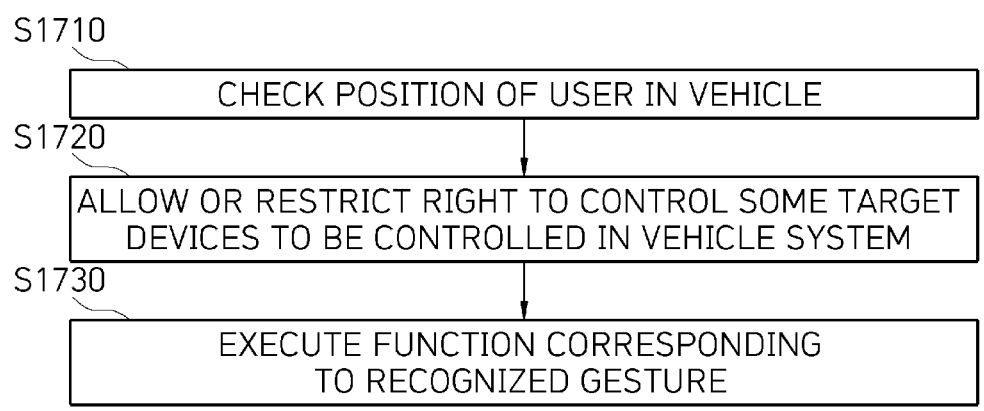

When the gesture recognition apparatus 200 recognizes the pinch out gesture in a state in which the wearable device 100 is located in the fourth part 1440, the gesture recognition apparatus 200 may adjust a wind speed of the air conditioner or change wind speed information displayed on the display 250 as illustrated in FIG. 15D in response to the pinch out gesture.

When the gesture recognition apparatus 200 recognizes the first gesture on the basis of the motion information received from the wearable device 100, the gesture recognition apparatus 200 checks a device in which the wearable device is relatively closer thereto among the plurality of target devices to be controlled in the vehicle system, and the gesture recognition apparatus 200 controls a function corresponding to the corresponding device to be executed.

The target devices to be controlled include, for example, at least one device of an HUD, a steering wheel, an SVM, an air conditioner, and a navigation system.

The gesture recognition apparatus 200 executes various functions in the vehicle system according to the part (or the position of the finger of the user who wears the wearable device 100) in which the wearable device 100 is located.

The gesture recognition apparatus 200 supports various functions of the vehicle system so as to be controlled based on a simple gesture.

FIGS. 16 to 19 illustrate a gesture recognition method according to the present invention.

In operation S1610, a gesture recognition apparatus 200 receives motion information from a wearable device 100.

In operation S1620, the gesture recognition apparatus 200 determines a position of the wearable device 100 in a vehicle.

In operation S1630, the gesture recognition apparatus 200 performs or does not perform gesture recognition based on the motion information according to the position of the wearable device 100.

When it is determined that the wearable device 100 is located in a first region, the gesture recognition apparatus 200 performs the gesture recognition, and when it is determined that the wearable device 100 is located in a second region, the gesture recognition apparatus 200 does not perform the gesture recognition.

In operation S1640, when the gesture recognition apparatus 200 recognizes a gesture, the gesture recognition apparatus 200 executes a function corresponding to the recognized gesture.

In operation S1710, the gesture recognition apparatus 200 checks a position of a user who wears the wearable device 100.

In operation S1720, the gesture recognition apparatus 200 allows or restricts the right to control at least some of a plurality of target devices to be controlled in a vehicle system according to the checked position of the user.

For example, when the user is located in a driver's seat, the gesture recognition apparatus 200 grants all of the gesture-based right to control the vehicle system, for example, the right to control vehicle driving (e.g., an ASCC setting function, an inter-vehicle interval setting function, a drive mode setting function, and an ADAS setting function), the right to control an infotainment device (e.g., volume) for all seats, and the right to control air conditioners for all seats.

When the user is located in an auxiliary seat or a rear seat, the gesture recognition apparatus 200 grants only the right to control (e.g., the right to control the vehicle operation) some the target devices to be controlled in the vehicle system.

In operation S1730, when the gesture recognition apparatus 200 recognizes the user's gesture on the basis of the motion information received from the wearable device 100, the gesture recognition apparatus 200 may execute the function corresponding to the recognized gesture through the target devices to be controlled, for which the right to control are granted, among the plurality of target devices to be controlled in response to the recognized gesture.

Figure 18:
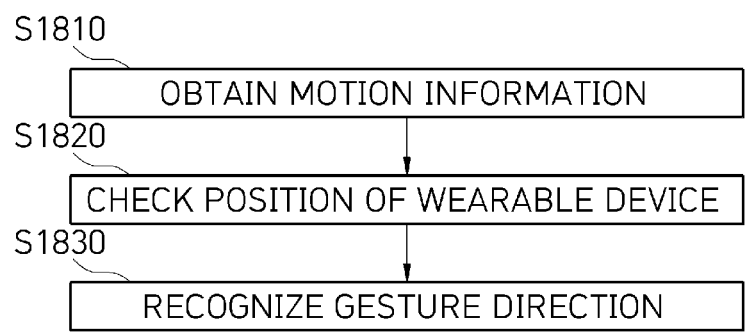

Referring to FIG. 18, in operation S1810, the gesture recognition apparatus 200 obtains the motion information from the wearable device 100.

In operation S1820, the gesture recognition apparatus 200 determines whether the wearable device 100 is located in the air in the vehicle or is located on a designated plane in the vehicle.

In operation S1820, the gesture recognition apparatus 200 recognizes the gesture on the basis of the motion information, and when it is determined that the wearable device 100 is located in the air or is located on the designated plane, the gesture recognition apparatus 200 recognizes a gesture direction differently.

For example, when it is determined that the wearable device 100 is located in the air, the gesture recognition apparatus 200 determines coordinate values (x, y, z) of the motion information by using a lateral direction, an vertical direction, and a front-rear direction of the vehicle as an x-axis, a y-axis, and a z-axis, respectively.

When it is determined that the wearable device 100 is located on the designated plane, the gesture recognition apparatus 200 determines the coordinate values (x, y, z) of the motion information by using the lateral direction, the front-rear direction, and the vertical direction of the vehicle as the x-axis, the y-axis, and the z-axis, respectively.

Figure 19:
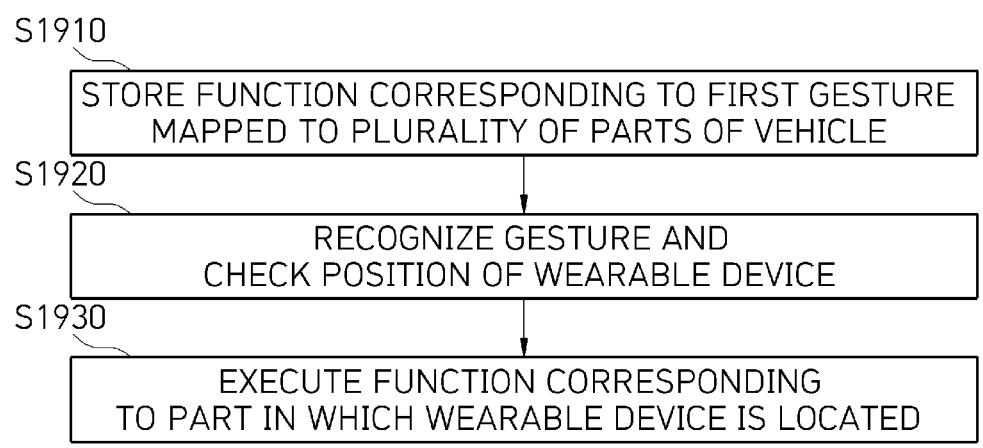

Referring to FIG. 19, in operation S1910, the gesture recognition apparatus 200 stores a plurality of functions corresponding to the first gesture mapped to the plurality of parts in the vehicle in a memory 260.

When there are the plurality of functions corresponding to the first gesture mapped to the plurality of parts stored in the memory 260, operation S1910 is omitted.

The plurality of parts include a first part 1410 located within a second designated distance (e.g., 10 cm) from an HUD (the display 250) located on an upper end of a steering wheel, a second part 1420 located within a third designated distance (e.g., 3 cm) from the steering wheel, a third part 1430 located within a fourth designated distance (e.g., 3 cm) from an SVM, and a fourth part 1440 located within a fifth designated distance (e.g., 3 cm) from an air conditioner.

In operation S1920, when the gesture recognition apparatus 200 recognizes the first gesture on the basis of the motion information received from the wearable device 100, the gesture recognition apparatus 200 checks the position of the wearable device 100 in the vehicle.

In operation S1930, the gesture recognition apparatus 200 executes a function corresponding to the part in which the wearable device 100 is located among the plurality of functions.

When the gesture recognition apparatus 200 recognizes the gesture through the wearable device 100, the gesture recognition apparatus 200 provides a function corresponding to the recognized gesture differently according to the position of the wearable device 100, the position of the user, the gaze of the user, the user information (e.g., age information), or the target device to be controlled.

Meanwhile, the gesture recognition method according to the embodiment of the present invention may be implemented in a computer system or recorded on a recording medium. The computer system may include at least one processor, memory, user input device, data communication bus, user output device, and storage. The above-described components perform data communication through the data communication bus.

The computer system may further include a network interface coupled to a network. The processor may include a central processing unit (CPU) or a semiconductor device that processes instructions stored in the memory and/or the storage.

The memory and the storage may include various types of volatile or nonvolatile storage media. For example, the memory may include a read only memory (ROM) and a random access memory (RAM).

Therefore, the gesture recognition method according to the embodiment of the present invention may be implemented in a computer-executable method. When the gesture recognition method according to the embodiment of the present invention is performed in a computer device, computer-readable instructions may perform the gesture recognition method according to the present invention.

Meanwhile, the gesture recognition method according to the present invention described above may be implemented as computer-readable code on a computer-readable recording medium. The computer-readable recording medium includes any type of recording medium in which data that may be decoded by a computer system is stored. For example, the computer-readable recording medium may include a ROM, a RAM, a magnetic tape, a magnetic disk, a flash memory, an optical data storage device, and the like. Further, the computer-readable recording medium may be distributed in computer systems connected through a computer communication network and may be stored and executed as code that may be read in a distributed manner.

According to the present invention, it is possible to improve user convenience for gesture operations.

Effects of the present invention are not limited to the above-described effects and other unmentioned effects may be clearly understood by those skilled in the art from the above descriptions.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A gesture recognition apparatus comprising:
a first communication circuit configured to communicate with a wearable device worn on a first body part of a user;
a memory in which a gesture recognition program is stored; and
a processor configured to execute the gesture recognition program,
wherein the processor is configured to
receive motion information from the wearable device through the first communication circuit,
check a position of the wearable device,
determine whether the position of the wearable device is within one of a plurality of preset regions, wherein the plurality of preset regions include a first preset region and a second preset region,
determine whether a gesture is to be recognized according to the position of the wearable device on the basis of the motion information, and
execute a function corresponding to the gesture in response to a determination that the wearable device is located in the first preset region, and in response to a determination that the wearable device is located in the second preset region, the processor does not perform the gesture recognition based on the motion information, wherein the first preset region includes a plurality of parts, and wherein the processor is configured to execute a first function in response to detection of a gesture in a first part of the first preset region and to execute a second function in response to detection of the gesture in a second part of the first preset region, and wherein the first preset region includes a plurality of planes, and wherein the processor is configured to execute a first function in response to detection of a gesture in a first plane of the first preset region and to execute a second function in response to detection of the gesture in a second plane of the first preset region.

2. The gesture recognition apparatus of claim 1, wherein the second preset region includes at least one designated region of a steering wheel, a gear rod, and an armrest.

3. The gesture recognition apparatus of claim 1, wherein, when the wearable device approaches the second preset region, the processor is configured to determine whether the first body part grips a designated part in the second preset region on the basis of the motion information and not perform the gesture recognition based on the motion information.

4. The gesture recognition apparatus of claim 1, wherein, in response to a determination that the wearable device is located in the second preset region, the processor is further configured to charge a battery of the wearable device through a power transmission circuit.

5. The gesture recognition apparatus of claim 1, wherein the processor is configured to obtain biometric information of the user from the wearable device, identify an emotional state of the user on the basis of the biometric information, and execute the function corresponding to the recognized gesture differently according to the emotional state.

6. The gesture recognition apparatus of claim 1, wherein the processor is configured to track a gaze of the user on the basis of an image captured by a camera, determine a target device to be controlled located in a direction of the gaze of the user, and allow the target device to be controlled to execute the function corresponding to the recognized gesture.

7. The gesture recognition apparatus of claim 1, wherein the processor is configured to check the position of the wearable device using an ultra-wideband (UWB) communication method through the first communication circuit.

8. The gesture recognition apparatus of claim 1, wherein the processor is configured to receive, from the wearable device, information related to a touch of the first body part on the wearable device and execute the function corresponding to the recognized gesture differently according to whether the user touches the wearable device.

9. A gesture recognition method comprising:
receiving motion information from a wearable device;
checking a position of the wearable device;
determining whether the position of the wearable device is within one of a plurality of preset regions, wherein the plurality of preset regions include a first preset region and a second preset region;
determining whether a gesture is to be recognized according to the position of the wearable device on the basis of the motion information; and
executing a function corresponding to the recognized gesture in response to a determination that the wearable device is located in the first preset region,
in response to a determination that the wearable device is located in the second preset region, suspending performance of the gesture recognition based on the motion information,
wherein the first preset region includes a plurality of parts, and wherein the processor is configured to execute a first function in response to detection of a gesture in a first part of the first preset region and to execute a second function in response to detection of the gesture in a second part of the first preset region, and
wherein the first preset region includes a plurality of planes, and wherein the processor is configured to execute a first function in response to detection of a gesture in a first plane of the first preset region and to execute a second function in response to detection of the gesture in a second plane of the first preset region.

10. The gesture recognition method of claim 9, wherein the determining whether the gesture is to be recognized includes, when the wearable device approaches the second preset region, determining whether the first body part grips a designated part in the second preset region on the basis of the motion information, and when it is determined that the first body part grips the designated part, not performing the gesture recognition based on the motion information thereafter.

11. The gesture recognition method of claim 9, further comprising, charging a battery of the wearable device through a power transmission circuit in response to a determination that the wearable device is located in the second preset region.

12. The gesture recognition method of claim 9, wherein the executing the function corresponding to the recognized gesture includes identifying an emotional state in consideration of biometric information of a user obtained from the wearable device and controlling the function to be executed differently according to the emotional state.

13. The gesture recognition method of claim 9, wherein the executing the function corresponding to the recognized gesture includes determining a target device to be controlled according to a result of tracking a gaze of a user and controlling the function corresponding to the recognized gesture to be executed on the target device to be controlled.

* * * * *